April 12, 1966     H. L. McCLELLAN     3,245,098
METHOD FOR FORMING HOLLOW ARTICLES
Original Filed Sept. 18, 1963     2 Sheets-Sheet 1
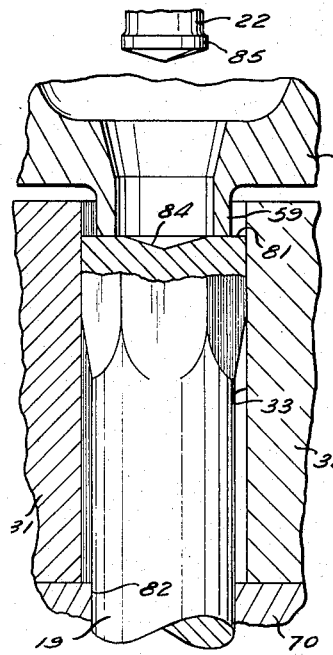
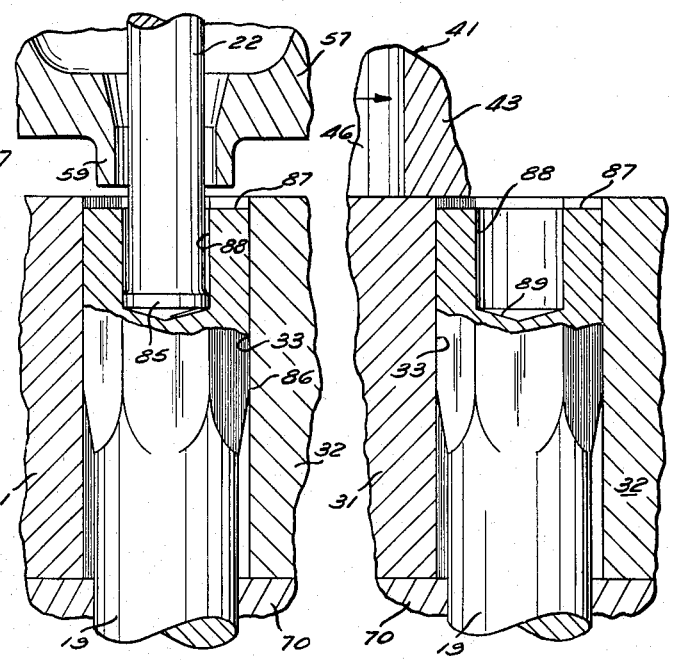
Fig. 1a     Fig. 1b     Fig. 1c
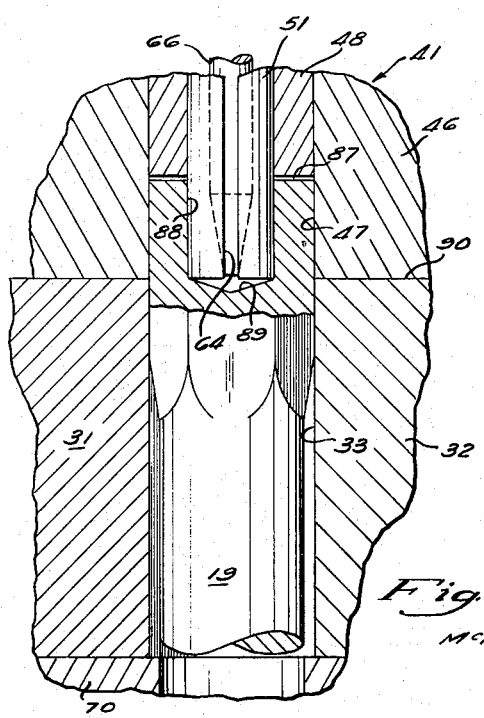
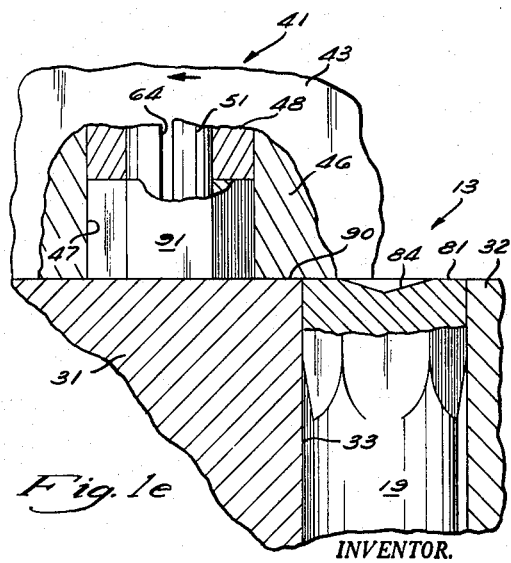
Fig. 1d     Fig. 1e
INVENTOR.
HERBERT L. McCLELLAN
BY
McNENNY, FARRINGTON, PEARNE, & GORDON
ATTORNEYS April 12, 1966 H. L. McCLELLAN 3,245,098
METHOD FOR FORMING HOLLOW ARTICLES
Original Filed Sept. 18, 1963 2 Sheets-Sheet 2

INVENTOR.
HERBERT L. McCLELLAN
BY
McNENNY, FARRINGTON, PEARNE & GORDON
ATTORNEYS

United States Patent Office 3,245,098
Patented Apr. 12, 1966

3,245,098
METHOD FOR FORMING HOLLOW ARTICLES
Herbert L. McClellan, Tiffin, Ohio, assignor to The National Machinery Company, Tiffin, Ohio, a corporation of Ohio
Original application Sept. 18, 1963, Ser. No. 309,787. Divided and this application Jan. 13, 1965, Ser. No. 425,157
20 Claims. (Cl. 10—86)

This invention relates generally to a method of forging articles and more particularly to a novel and improved method for forming tubular articles such as nut blanks and the like without scrap. This application is a division of my copending application, Serial No 309,787, filed September 18, 1963.

In the illustration form of the present invention, a nut blank is cold formed without scrap. In this illustrated embodiment, the end portion of round wire stock is positioned within a die having a polygonal die cavity formed with a width across the flats substantially equal to the diameter of the stock. A punch having a diameter equal to the required diameter of the through passage in the final blank is then pressed into the end of the stock upsetting the stock into a polygonal shape and simultaneously backward extruding the upset stock around the punch forming a portion having a polygonal exterior surface and a blind bore or passage extending into the portion.

The punch is then removed and the pierced or punched portion is sheared from the stock to form the desired tubular article. The stock is positioned so that the bottom of the blind passage is accurately located at the plane of shearing and the walls, both internal and external, are supported against distortion during the shearing operation. The blank is then progressively worked in subsequent dies to form the crowned end and washer face.

In the illustrated embodiment of this invention, the stock is cold worked. However, the invention is applicable for hot forming of articles particularly when the articles are of large size or are formed of medium and high carbon steels, stainless steel and some non-ferrous alloys. Again, in some instances, the first operation is performed hot and the subsequent operations performed cold.

The nut blank produced at the first working station is sufficiently well formed to be threaded without additional forming operations and meets the specification requirements of some grades of nuts which do not require crowned ends or washer faces. This invention, therefore, makes it possible to completely form such grades of nut blanks at a single die station without scrap.

The nut blank illustrated is formed with a hexagonal peripheral shape. It should be understood, however, that it may be square or of other polygonal shape and that other tubular articles such as roller chain bushings, pipe couplings and the like, can be manufactured by a method incorporating this invention.

It is an important object of this invention to provide a novel and improved method for forming tubular articles without scrap.

It is another important object of this invention to provide a novel and improved method for upsetting and extruding a tubular article having a non-circular section in a single blank working station.

It is another important object of this invention to provide a method for forming tubular articles which includes the step of backward extruding a portion of stock to form a blind bore or passage in such stock followed by the step of shearing off the pierced portion of stock to form a tubular article.

It is still another object to provide a method according to the preceding objects followed by subsequent working operations to produce a finished nut blank without scrap.

Further objects and advantages will appear from the following description and drawings wherein:

FIGURE 1a is a fragmentary section of the first die station illustrating the position of the elements when the stock is pressed back into the die and as the punch approaches the stock; (the section is taken diagonally across the corners of the hexagonal section to better illustrate the blank and die shape);

FIGURE 1b is a view similar to FIGURE 1a illustrating the position of the elements at the completion of the upsetting and extrusion operation;

FIGURE 1c is a view similar to FIGURES 1a and 1b illustrating the position of the elements after the tool is removed from the stock and the shear is moving toward the position aligned with the die;

FIGURE 1d is a view similar to FIGURES 1a through 1c illustrating the elements when the shear is positioned in alignment with the die and after the stock is moved into the shear;

FIGURE 1e illustrates the elements in a position immediately after the shearing of the blank from the stock;

Figure 2:
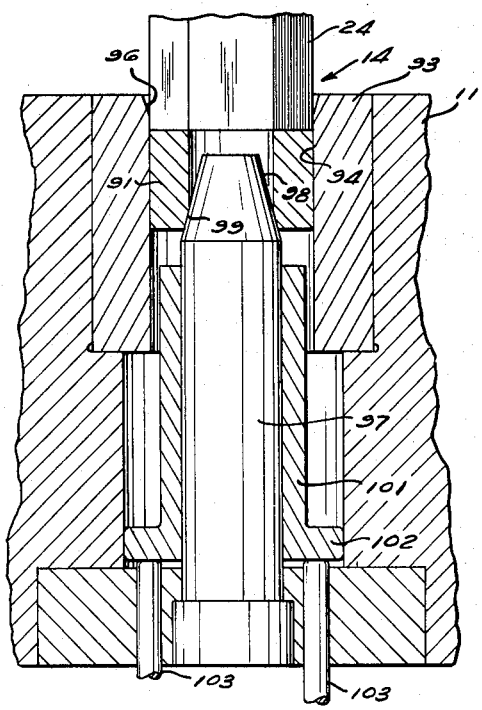
FIGURE 2 is a fragmentary longitudinal section of the second die station illustrating the position of the elements at the completion of the work stroke.

In my copending application, Serial No. 309,787, filed September 18, 1963, a machine including the structure and power drives is disclosed which is particularly suited for the practice of a method incorporating this invention. In that machine a first die station is provided with dies, tools and a shear which all cooperate to produce the tubular blank without scrap. This article is then automatically transferred to subsequent die stations in which the blank is progressively worked to form a finished nut blank. In order to simplify the understanding of this method, however, the supporting apparatus and the drives therefor have not been illustrated herein.

Four blank working stations 13, 14, 16 and 17 are illustrated and include cooperating dies and tools which progressively work the stock to form the finished nut blank. The dies in the first die station 13 (illustrated in FIGURES 1a through 1e) include a die element laterally movable between a closed position in which the stock is securely clamped and an open position in which the stock is free for feeding. The second, third and fourth die stations 14, 16 and 17, respectively, contain closed dies mounted in a die breast 11 in which the nut blank is crowned, chamfers are formed and a washer face is produced.

A shear mechanism 41 is mounted for movement between positions adjacent to the first die station 13 and a transfer station (not shown) and operates to shear off stock worked by the punch 22 in the first die station 13 and position the sheared stock or blank in the transfer station for subsequent transfer to the die stations 14, 16 and 17.

Referring to FIGURES 1a through 1e, fixed die element 31 and a laterally movable die element 32 are mounted at the first die station 13. A clamping mechanism is connected to move the movable die element 32 between a closed position in which the stock 19 is tightly gripped and an open position in which the stock is free for axial feeding. The two die elements 31 and 32 cooperate when closed to define a die cavity 33 having a polygonal cross-section. In the illustrated embodiment, the die cavity 33 is hexagonal in cross-section with three sides of the cavity in each of the dies 31 and 32. The joint between the die elements 31 and 32 extends along opposite edges of the hexagonal cavity. Therefore, the flats of the die cavity are solid and the upset portion formed therein has smooth sides. However, the section illustrated in FIGURES 1a through 1e is taken across the corners of the cavity to better illustrate its shape.

The shear mechanism 41 is mounted for lateral movement along the face of the dies 31 and 32 between the first die station 13 and the transfer station.

The shear mechanism 41 includes a shear or cutting ring 46 mounted in a holder 43 and a stock gauge 51 centrally positioned in the ring 46. The stock gauge 51 is formed with an axially extending lateral slot 64 so that the stock gauge can be spread laterally into supporting engagement with the wall of the bore formed in the stock by the tool 22. To spread the stock gauge 51, a spreader pin 66 formed with a conical cam surface at its forward end is mounted for axial movement within the stock gauge. The stock gauge 51 is formed with a mating cam surface engaged by the surface on the pin 66 to spread the forward end of the stock gauge 51 when the pin is pressed forward. The shear ring 46 is formed with a polygonal passage 47 proportioned to receive the rearward polygonal end of the stock.

A reverse feed mechanism is provided to push the stock back into the dies when the shear mechanism 41 is in alignment with the transfer station. The reverse feed mechanism includes an operating sleeve 57 having a forward end formed with a tubular flange 59 proportioned to allow passage of the punch 22 with clearance and also to fit the die cavity 33 with clearance. When the sleeve 57 is pressed forward so that the flange 59 extends into the cavity 33 the end of the flange engages the stock and pushes the stock back a predetermined distance behind the face of the dies. During this operation the clamping mechanism is released to permit the stock to slide in a rearward direction.

FIGURES 1a through 1e progressively illustrate the operations which occur at the first die station 13. At the beginning of the cycle as a punch 22 moves forward the stock 19 is in the position illustrated in FIGURE 1e with its forward end 81 flush with the face of the dies 31 and 32 and the dies are open to permit axial movement of the stock. During this portion of the cycle, as the punch 22 is moving toward the stock, a sleeve 57 is pressed forward to move its flange 59 into engagement with the end of the stock 81 and press the stock back from the face of the dies 31 and 32 to the position illustrated in FIGURE 1a. This occurs during the forward stroke of the punch 22 but before the punch reaches the stock 19. The sleeve 57 then returns to its initial position with the flange 59 spaced back from the face of the dies 31 and 32.

During the retraction of the sleeve 57 the dies 31 and 32 are closed and cooperate to form a polygonal die cavity 33 as well as to support the stock and prevent lateral buckling thereof during piercing. Rearwardly of the dies 31 and 32 a pair of gripper segments 70 are provided which are also opened and closed by the clamp mechanism to clamp the stock against rearward movement under the force of the punch during its piercing of the stock. The gripper elements 70 are preferably made relatively long so that they will provide a sufficiently large gripping area to prevent slipping without damaging the stock surface.

The forward end of the stock 19 has been upset to a polygonal shape by the previous cycle of operation and a shallow conical recess 84 produced by the end of the tool 22 is formed in the end face of the stock. A substantial portion of the stock contained within the polygonal die cavity 31, however, is not upset to the hexagonal shape and still retains the cylindrical or original rod shape. The diameter of the stock 19 is substantially equal to the width across the flats of the die cavity 33 so that the stock is supported against buckling.

When the punch 22 enters the end of the stock, two simultaneous actions take place. The punch produces upsetting pressures on the stock within the polygonal die cavity 31 causing it to upset to a hexagonal shape ahead of the punch and at the same time backward or rearward extrusion takes place along the punch and the cavity until the condition illustrated in FIGURE 1b is reached. The punch 22 is formed with an extrusion land 85 to reduce the friction of extrusion.

A comparison of the two FIGURES 1a and 1b illustrates that the stock ahead of the punch is upset to a polygonal shape and that the length of the upset does not extend to the bottom of the polygonal die, but rather terminates at a zone 86. Due to the displacement causing the backward extrusion produced by the punch 22, the stock extends to an end face 87 closer to the end face on the dies. Since the material of the stock is upset to a polygonal shape ahead of the punch, as illustrated, the backward flow of extrusion past the forward end of the punch 22 produces an extruded section having a well defined polygonal external surface and a clean, well shaped blind bore 88.

After the punching operation is completed, the punch 22 is carried back out of the blind bore 88. Thereafter, the die 32 is opened releasing the gripping force on the stock and the shear mechanism 41 moves into alignment with the die station 13.

After the opening 47 in the shear ring 46 is positioned in alignment with the first die station 13, the stock 19 is moved forward into the opening 47 to the position illustrated in FIGURE 1d at which time a stock gauge 51 carrier by the shear mechanism engages the end wall 89 of the blind bore 88. The end wall 89 of the blind bore 88 has a conical shape corresponding to the end of the punch 22 and the stock gauge 51 is formed with a flat or planar end. Therefore, the stock gauge engages the end wall only adjacent to the intersection between the end wall 89 and the side walls of the blind bore 88. The stock gauge is sized to fit the blind bore 88 with a minimum amount of clearance necessary for the feeding of the stock forward to the position of FIGURE 1d.

After the stock 19 is fed forward until it engages the stock gauge 51, as illustrated in FIGURE 1d, a pin 66 is driven forward into the camming section in the stock gauge 51 expanding the stock gauge 51 into tight engagement with the inner wall of the blind bore 88 immediately adjacent the intersection thereof with the end wall 89.

The cutter ring 46 on the shear mechanism is positioned with its end face immediately adjacent to the end face of the dies 31 and 32 and cooperates with the dies 31 and 32 and the stock gauge 51 to constitute a shearing device having a shear plane 90 lying along the face of the dies. When the shear mechanism 41 is moved laterally from the position of FIGURE 1d, the tubular section of stock is sheared away to form a separate tubular blank 91 having a through bore and an external polygonal surface.

In order to prevent distortion and to achieve a smooth cut of the stock, the various elements are proportioned and arranged to support the stock on both sides of the shear plane 90. The shear plane 90 passes through the intersection of the side wall of the blind bore 88 and the bottom wall 89 so the stock on the die side of the shear plane is solid with the exception of the shallow conical recess of the end wall 89. Since the recess is shallow, it does not provide a weakness in the stock at the shear plane. The outer surface is supported by the dies 31 and 32 so distortion will not occur on the die side of the shear plane during the shearing operation. The stock extending into the cutting ring 46 is supported adjacent to the shear plane along its outer surface by the wall of the polygonal opening 47 of the shear ring 46 and the inner surface of the bore 88 is supported by the stock gauge 511 so distortion of the stock of the blank 91 is prevented. The slot 64 in the stock gauge 511 is perpendicular to the direction of shear movement so the stock gauge 511 provides full support in the direction of the shearing forces.

In actual practice blanks sheared in this manner have been found to have substantially smooth faces and distortion produced by shearing is substantially non-existent. As the shearing mechanism 41 moves across the die breast to a position adjacent the transfer station, it passes through the intermediate position illustrated in FIGURE 1e. It should be noted that the stock 19 at the first die station 13 is again in the initial condition with the end face 81 aligned with the end face of the dies 31 and 32. When the shear mechanism 41 moves to the transfer station the entire cycle is repeated with the sleeve 57 moving forward to push the stock back into the die cavity 33. Also the blank 91 is ejected from the ring by the knockout sleeve 48 moving forward and ejecting the blank 91 into the transfer station.

By providing reverse feed for the stock before it is pierced by the punch 22 the forward face of the stock remains behind the face of the dies at the first die station 13 even after the backward extrusion occuring therein. Therefore, no projection is provided to interfere with or obstruct the movement of the shear across the face of the die to the position to receive the stock. A transfer (not shown) carries the blank 91 to the second die station 14.

The second die station 14, illustrated in FIGURE 2, includes a tubular die element 93 formed with an internal polygonal passage 94 therethrough and a flaring mouth 96 which operates to guide the blank 91 formed at the first die station into the second die station from the transfer fingers. The passage 94 is proportioned to closely fit the blank 91 so the exterior surface of the blank is not distorted or worked at this station.

A tool 97 is mounted in the die breast 11 and is formed with a conical end section 98 positioned within the die element 93 and located so that one end of the passage through the blank 91 is upset to form a chamfer 99 in one end of the blank as the blank is pushed into the die by the tool 24 on the header slide 12.

An ejecting sleeve 101 is mounted around the tool 97 for sliding movement relative thereto and is formed with a rearward flange 102 engaged by knockout pins 103 which are moved forward when the blank is ejected from the second die station 14.

Figure 3:
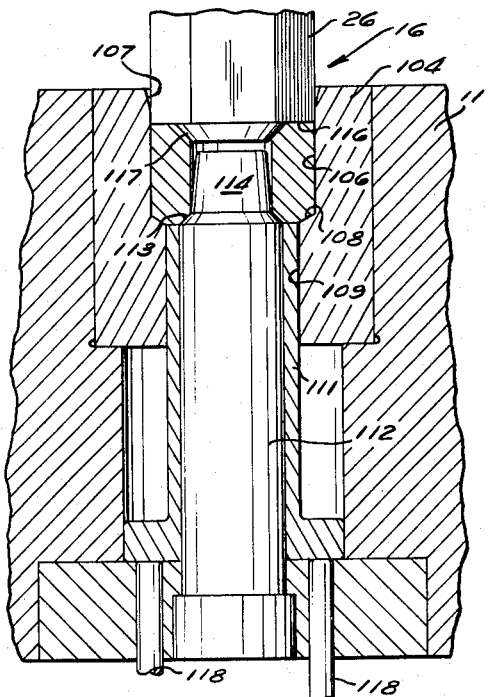
FIGURE 3 is a fragmentary longitudinal section of the third die station illustrating the position of the elements at the completion of the work stroke.

The transfer mechanism transfers the blank from the second die station 14 to the third die station 16, illustrated in FIGURE 3, turning the blank end for end during the transfer operation. The blank is worked at the third die station 16 to form a chamfer on each end of the bore and crown on one end. To perform this function, a die element 104 mounted on the die breast 11 is formed with a polygonal die cavity 106 extending from a flaring mouth 107 to a conical shoulder 108. The shoulder 108 terminates in a circular bore 109 in which an ejector sleeve 111 is located. A tool 112 mounted in the die breast extends through the ejector sleeve 111 and is formed with a conical shoulder 113 and a tapered projection 114. The angle of the conical shoulder is greater than the angle of the conical surface 98. The lower end of the projection 114 has a diameter substantially equal to the diameter of the bore through the blank so that the inner wall of the blank is supported against distortion during the working occurring at this die station. The tool 26 is formed with a polygonal external surface adapted to closely fit the die cavity 106 and a radial end face 116. Internally of the end face 116, the tool is provided with a tapered nose 117.

As the tool 26 moves forward, the blank positioned by the transfer mechanism in alignment with the third die station is pushed forward into the die. The inner end of the blank is upset by the conical shoulders 108 and 113 so that a chamfer is formed on the inner end of the nut blank by the shoulder 113 and a crown is formed by the shoulder 108. The ejector sleeve 111 is positioned so that its end face extends across between the two shoulders 108 and 113 and is engaged by the blank to smooth the end face of the nut between the crown and the chamfer. The other end of the nut is worked by the nose 117 and the end face 116 so that a chamfer is formed at the entrance of the bore and the end face of the nut is squared by the radial shoulder 116. By working both end faces of the nut in this manner the end faces are squared and are made smooth. As the punch 26 is carried back knockout pins 118 operate to push the ejector sleeve 111 forward ejecting the blank into the transfer mechanism which transports the blank to the fourth and final die station 17. Here again, the transfer mechanism turns the blank end for end during the transfer operation.

Figure 4:
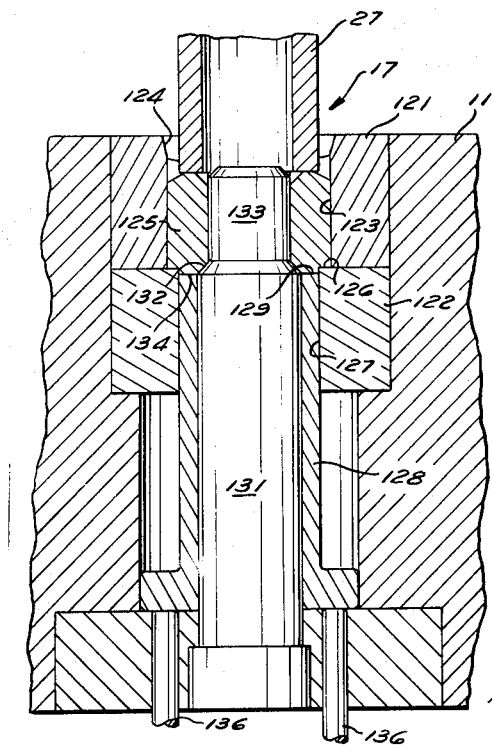
FIGURE 4 is a fragmentary longitudinal section of the fourth die station illustrating the elements at the completion of the work stroke.

Two die elements 121 and 122 are mounted in the die breast 11 at the fourth die station 17, illustrated in FIGURE 4. The first die element 121 is formed with a polygonal die cavity 123 and a flaring guide mouth 124. The second die element 122 is formed with an end face 126 engaging the inner end of the first die element 121 and a through bore 127. The end face 126 projects inwardly from the inner surface of the die cavity 123 to form a shoulder which forms the washer face of the finished nut blank 125. An ejector sleeve 128 extending into the bore 127 terminates at a face 129 inwardly spaced from the end face 126. A tool 131 is mounted in the die breast 11 and extends up through the ejector sleeve 128. The tool 131 is formed with a conical portion 132 and an end projection 133 with a diameter substantially equal to the diameter of the passage in the blank. When the tool 27 presses the blank against the shoulder formed by the end face 126 the washer face is formed and the blank is completed. After the tool 27 is carried back from the die station 17 the ejector sleeve 128 is pushed forward by ejector pins 136 and the finished blank 125 is ejected.

With a method incorporating this invention it is possible to manufacture nut blanks which are formed to meet the highest dimensional specification requirements for nut blanks without any scrap. Since all scrap is eliminated, the material costs are reduced to an absolute minimum and the manufacturing costs are minimized.

Although a preferred embodiment of this invention is illustrated, it is to be understood that various modifications and rearrangements of parts may be resorted to without departing from the scope of the invention as defined in the following claims.

What is claimed is:

1. A method of forming tubular articles from solid stock comprising backward extruding a portion of stock along a punch forming a blind passage therein, removing said punch and thereafter shearing said portion from said stock along a lateral plane intersecting said passage at a location spaced back from the extreme inner end thereof while supporting the wall of said passage adjacent said plane.

2. A method of forming tubular articles from rod stock comprising confining a portion of stock in a die having an internal wall with the shape of the periphery of said article, pressing a tool into said portion of stock thereby backward extruding said portion between said tool and die and forming a blind passage in said portion, removing said tool, and positioning said portion in cutting means having a shearing plane intersecting said passage, supporting the wall of said passage at said shearing plane and cutting said portion from said stock.

3. A method of forming tubular articles from rod stock comprising confining a portion of stock in a die having an internal wall with the shape of the periphery of said article, pressing a tool having a convex end surface into said portion of stock thereby backward extruding said portion between said tool and die and forming a blind passage having a concave inner end face in said portion, removing said tool, positioning a support element in said passage to support the wall thereof during cutting, and cutting said stock along a plane intersecting said passage at a location spaced from the extreme inner end thereof thereby forming said tubular article.

4. A method of forming tubular articles from rod stock comprising confining a portion of stock in a die having an internal wall with the shape of the periphery of said article, pressing a tool into said portion of stock upsetting said portion to the shape of said die and forming a blind passage in said portion, removing said tool, and positioning said portion in cutting means having a shearing plane intersecting the inner end of said passage, supporting the wall of said passage at said shearing plane and shearing said portion from said stock.

5. A method of forming non-circular tubular articles comprising positioning the end of solid stock in a die having a non-circular die cavity of uniform cross-section, pressing a tool into the end of said stock thereby upsetting stock ahead of said tool to the cross-section of said die and backward extruding upset stock between said tool and die to form a bore, moving shear means into alignment with said die cavity, moving the stock into said shear means to a position wherein the bottom of said bore formed by said punch is in a shear plane, supporting the wall of said bore adjacent said plane, and shearing said stock along said plane.

6. A method of forming non-circular tubular articles comprising positioning the end of solid stock base from the face of a die having a non-circular die cavity of uniform cross-section pressing a tool into the end of said stock thereby upsetting stock ahead of said tool to the cross-section of said die and backward extruding upset stock between said tool and die to form a bore, withdrawing said tool from said stock, moving shear means into alignment with said die cavity, moving the stock into said shear means to a position wherein the bottom of said bore formed by said punch is in a plane containing said face of said die, supporting the wall of said bore adjacent said plane, and shearing said stock along said plane.

7. A method of forming non-circular tubular articles comprising positioning the end of solid stock in a die having a non-circular die cavity of uniform cross-section and a predetermined depth with the end face of said stock spaced back from the face of said die, pressing a tool into the end of said stock to a depth substantially less than said predetermined depth thereby upsetting stock ahead of said tool to the cross-section of said die and backward extruding upset stock between said tool and die to form a bore, the upset portion terminating at a point spaced from the inner end of said cavity and the end face of extruded stock being spaced back from the face of said die, withdrawing said tool from said stock, moving shear means into alignment with said die cavity, moving the stock out of said cavity into said shear means to a position wherein the bottom of said bore formed by said punch is in a plane containing said face of said die, supporting the wall of said bore adjacent said plane, and shearing the portion of stock contained in said shear means from said stock.

8. A method of forming non-circular tubular articles comprising positioning the end of solid stock in a die having a non-circular die cavity of uniform cross-section and a predetermined depth, gripping said stock adjacent said cavity, pressing a tool into the end of said stock to a depth substantially less than said predetermined depth thereby upsetting stock ahead of said tool to the cross-section of said die and backward extruding upset stock between said tool and die forming a bore, said die and tool being proportioned so that the upset extends to a position spaced from the inner ends of said die cavity, withdrawing said tool from said stock, releasing said gripping, moving shear means into alignment with said die cavity, moving the stock into said shear means to a position wherein the bottom of said bore formed by said punch is in a plane containing the face of said die, supporting wall of said bore adjacent said plane, shearing the portion of stock contained in said shear means from said stock, and thereafter moving the sheared end of said stock back into said die cavity to a depth at least as great as the increase in length produced by said backward extrusion.

9. A method of forming non-circular tubular articles comprising positioning the end of solid stock in a die having a non-circular die cavity of uniform cross-section and a predetermined depth, gripping said stock adjacent said cavity, pressing a tool into the end of said stock to a depth substantially less than said predetermined depth thereby upsetting stock ahead of said tool to the cross-section of said die and backward extruding upset stock between said tool and die forming a bore, said die and tool being proportioned so that the upset extends to a position spaced from the inner ends of said die cavity, withdrawing said tool from said stock, releasing said gripping, moving shear means into alignment with said die cavity, moving the stock into said shear means to a position wherein the bottom of said bore formed by said punch is in a plane containing the face of said die, supporting the wall of said bore adjacent said plane, shearing the portion of stock contained in said shear means from said stock, and thereafter upsetting the ends of the sheared portion to form smooth parallel ends perpendicular to said bore.

10. A method of forming nut blanks having a through bore and a polygonal periphery comprising positioning the end of solid cylindrical stock in a die having a polygonal die cavity, forming a polygonal upset on the end of said stock having a length exceeding the length of said blanks by pressing a tool having a circular section into said end thereby upsetting stock ahead of said tool to a polygonal section and backward extruding upset stock between said die and tool to form a blind bore, shearing off a blank from said stock along a plane through the upset portion and containing the bottom of said bore whereby after shearing the stock on both sides of said plane has a polygonal shape, and thereafter shaping the ends of said blank in separate dies.

11. A method of forming nut blanks having a through bore and a polygonal periphery comprising positioning the end of solid cylindrical stock in a die having a polygonal die cavity having a diameter across the flats substantially equal to the diameter of said stock, forming a polygonal upset on the end of said stock having a length exceeding the length of said blanks by pressing a tool having a circular section into said end thereby upsetting stock ahead of said tool to a polygonal section and backward extruding upset stock between said die and tools to form a blind bore, removing said tool from said stock, and shearing off a blank from said stock along a plane through the polygonal section intermediate the ends thereof and containing the bottom of said bore.

12. A method of forming nut blanks having a through bore and a polygonal periphery comprising positioning the end of solid cylindrical stock in a die having a polygonal die cavity, forming a polygonal upset on the end of said stock having a length exceeding the length of said blanks by pressing a tool having a circular section into said end thereby upsetting stock ahead of said tool to a polygonal section and backward extruding upset stock between said die and tool to form a blind bore, removing said tool from said stock, shearing off a blank from said stock along a plane through the upset portion intermediate the ends thereof and containing the bottom of said bore, and thereafter progressively transferring said blank to a plurality of forging dies and shaping the ends of said blank.

13. A method of forming nut blanks comprising extruding solid cylindrical stock through an annular zone defined by a polygonal outer wall and a cylindrical inner wall wherein the initial diameter of the stock is substantially equal to the diameter across the flats of said polygonal outer wall thereby forming a blind passage of uniform circular cross-section and a polygonal outer surface having a length exceeding the length of said blanks on a portion of said stock, and shearing said stock along a plane through said polygonal outer surface and said blind passage to form a blank with a polygonal outer surface having a cylindrical passage therethrough and providing a polygonal end face on the remaining stock.

14. A method of forming nut blanks comprising extruding solid cylindrical stock through an annular zone defined by a polygonal outer wall and a cylindrical inner wall thereby forming a blind passage of uniform circular cross-section and a polygonal outer surface having a length exceeding the length of said blanks on a portion of said stock, shearing said stock along a plane through said polygonal outer surface and said blind passage to form a blank with a polygonal outer surface having a cylindrical passage therethrough and providing a polygonal end face on the remaining stock, and applying endwise pressure to said blank shaping the ends thereof to form a finished nut blank.

15. A method of forming a tubular article comprising positioning the end of a piece of stock within a die cavity having a predetermined cross-section adjacent the end face of the stock and a similar cross-section at least in a zone spaced inwardly along said stock from said end face, pressing a punch into said stock forming a blind bore in the stock extending from said end face to the adjacent side of said zone but terminating short of the remote side of said zone thereby upsetting said stock to the shape of said die cavity ahead of said punch, and thereafter severing a portion from said stock along a plane intersecting the end of said blind bore.

16. A method of forming tubular articles comprising gripping a piece of solid stock at a point spaced back from the end thereof and laterally confining the end of the stock forward of the zone of gripping within a die cavity having a uniform cross-section greater than the cross-section of the stock, pressing a punch into the stock forming a blind passage therein and upsetting the stock ahead of the punch to the cross-section of the die cavity, laterally releasing the entire portion of the stock between the end thereof and the zone of gripping, axially feeding the stock while it is laterally released, and shearing the stock along a plane intersecting said blind passage.

17. A method of forming an article comprising positioning the end of a piece of stock within a die cavity having a predetermined cross-section adjacent the end face of the stock and a similar cross-section at least in a zone spaced inwardly along said stock from said end face, pressing a punch into said stock forming a blind passage in the stock extending from said end face to the adjacent side of said zone but terminating short of the remote side of said zone thereby upsetting said stock to the shape of said die cavity ahead of said punch, and thereafter severing a portion from said stock along a plane intersecting the part of stock upset to the shape of said zone intermediate its ends thereby producing end faces on the material of the stock on both sides of said shear plane which are substantially equal in peripheral size and shape.

18. A method of forming blanks from rod stock comprising gripping said stock at a zone spaced back from the end face thereof while positioning the end portion of stock within a die cavity having a substantially uniform cross-section greater than the initial cross-section of said stock, forming an upset having a length exceeding the length of said blanks by exerting endwise pressure on said stock within said die cavity and upsetting an end portion of said stock to the shape of said die cavity, and thereafter shearing said stock along a lateral plane intersecting the upset portion thereof intermediate its ends producing end faces on the material of said stock on both sides of said shear plane having equal peripheral size and shape.

19. A method as set forth in claim 18 wherein said endwise pressure forms a transition section having sloping surfaces free of radial surfaces and sharp corners formed thereby, said transition section extending inwardly from the upset end portion.

20. A method of forming noncircular articles with a bore therethrough comprising positioning solid stock having a diameter substantially equal to the minimum lateral dimension of said article in a die having walls conforming to the shape of said article, pressing a tool into said stock while it is confined in said die forming a blind passage therein and forming an upset on the stock in said die having a length exceeding the length of said article, and thereafter shearing said article from said stock along a lateral plane through said passage and said upset while supporting the wall of said passage adjacent said plane, the end faces on said stock and said article formed by said shearing having the same exterior shape.

References Cited by the Examiner
UNITED STATES PATENTS 1,929,164 10/1933 Eden _____ 10—86
2,261,318 11/1941 Wilcox _____ 10—25

FOREIGN PATENTS 229,178 7/1960 Australia.
21,440 9/1914 Great Britain.
A.D. 1913
179,382 5/1922 Great Britain.

ANDREW R. JUHASZ, *Primary Examiner.*